United States Patent
Lohr et al.

(10) Patent No.: US 7,277,675 B2
(45) Date of Patent: Oct. 2, 2007

(54) ARRAY FOR THE CONTACT-LESS TRANSMISSION OF ELECTRICAL SIGNALS OR ENERGY

(75) Inventors: Georg Lohr, Eichenau (DE); Herbert Weithmann, Munich (DE); Harry Schilling, Georgensgmuend (DE)

(73) Assignee: Schleifring und Apparatebau GmbH, Fuerstenfeldbruck (DE)

( * ) Notice: Subject to any disclaimer, the term of this patent is extended or adjusted under 35 U.S.C. 154(b) by 679 days.

(21) Appl. No.: 10/273,982

(22) Filed: Oct. 18, 2002

(65) Prior Publication Data

US 2003/0094855 A1    May 22, 2003

Related U.S. Application Data

(63) Continuation of application No. PCT/DE01/01497, filed on Apr. 18, 2001.

(30) Foreign Application Priority Data

Apr. 18, 2000   (DE) ................. 100 19 371
May 26, 2000   (DE) ................. 100 26 175

(51) Int. Cl.
 *H04B 5/00* (2006.01)
(52) U.S. Cl. ................... 455/41.1; 340/854.8
(58) Field of Classification Search .......... 455/41, 455/121, 103, 105, 115, 39, 500, 526, 62, 455/113, 132, 41.1, 41.2, 276.1; 340/505, 340/825.72, 870.31, 825.71, 825.73, 854.3, 340/854.6, 854.8; 235/449–451
See application file for complete search history.

(56) References Cited

U.S. PATENT DOCUMENTS

| | | | | |
|---|---|---|---|---|
| 2,282,968 A | * | 5/1942 | Kenefake | 307/3 |
| 4,421,210 A | * | 12/1983 | Sugino | 188/32 |
| 4,441,210 A | * | 4/1984 | Hochmair et al. | 455/41.1 |
| 4,654,880 A | * | 3/1987 | Sontag | 455/41.2 |
| 4,782,342 A | * | 11/1988 | Walton | 340/941 |
| 5,451,763 A | | 9/1995 | Pickett et al. | 235/492 |
| 5,483,683 A | * | 1/1996 | Burrage | 455/127.1 |
| 5,548,838 A | * | 8/1996 | Talwar et al. | 455/304 |
| 5,892,300 A | * | 4/1999 | Rydval | 307/104 |
| 6,008,760 A | * | 12/1999 | Shattil | 342/378 |
| 6,351,626 B1 | * | 2/2002 | Lohr | 455/41.1 |
| 6,379,157 B1 | * | 4/2002 | Curry et al. | 439/676 |
| 6,448,873 B1 | * | 9/2002 | Mostov | 333/185 |
| 6,529,127 B2 | * | 3/2003 | Townsend et al. | 340/505 |

FOREIGN PATENT DOCUMENTS

| | | |
|---|---|---|
| DE | 41 25 145 A1 | 2/1993 |
| DE | 41 30 903 A1 | 3/1993 |
| DE | 197 01 357 | 7/1998 |
| DE | 197 05 301 C1 | 10/1998 |
| WO | WO98/29919 | 7/1998 |

\* cited by examiner

*Primary Examiner*—George Eng
*Assistant Examiner*—Nam Huynh
(74) *Attorney, Agent, or Firm*—Kevin L. Daffer; Daffer McDaniel, LLP

(57) ABSTRACT

The invention is characterized by the provisions that each transmitter comprises an AC voltage or current source, respectively, as well as a plurality of inductive coupling elements supplied from said source, which elements are supplemented by at least one capacitor to form elements capable of resonating, and that furthermore one control elements is that controls said AC voltage or current source, respectively, in such a way that the latter operates on a resonant frequency of said elements capable of resonating.

13 Claims, 4 Drawing Sheets

ARRAY FOR THE CONTACT-LESS TRANSMISSION OF ELECTRICAL SIGNALS OR ENERGY

This application is a continuation of pending International Application No. PCT/DE01/01497 filed Apr. 18, 2001, which designates the United States and claims priority from pending German Application Nos. 10019371 filed Apr. 18, 2000 and 10026175 filed May 26, 2000.

FIELD OF THE INVENTION

The present invention relates to an array for the contact-less transmission of electrical signals or energy, respectively.

PRIOR ART

Mechanical plug-and-socket connectors are frequently employed for contacting mobile means. Such mechanical contact systems are commercially available in a very wide variety of types and models. As a rule, a comparatively high expenditure is required in order to protect the contact systems from influences from the environment. Here, aspects such as touch-preventing guards, protection from penetrating liquids such as water, oil or even moisture play an important role. Particularly high demands prevail in areas protected from explosion. In order to satisfy such requirements it is necessary to encapsulate the contact means in a complex and high-cost manner. As a consequence, the structure is substantially changed whilst handling is rendered more difficult. Specifically with frequent plugging and unplugging cycles, such plug-and-socket connectors present serious disadvantages. To this adds mechanical wear on the contacts, which is expressed initially in a higher contact resistance up to total failure.

Here, contact-less connecting systems constitute a substantial improvement. Non-contacting transmission systems, which are based on inductive coupling, are known in manifold configurations. One example of a system based on inductive coupling is described in German Patent 197 01 357. It avoids the principal disadvantage of contacting systems but it entails comparatively high production costs. In this respect, a separate AC voltage generator and, on the opposite side, a corresponding rectifier are necessary for each transmission system. This results in very high costs particularly in installations with a high number of contacting means.

Another disadvantage of such arrays of the type that it described in an exemplary way in the German Patent DE 41 25 145 A1 is the demand of a comparatively invariable coupling with a low leakage inductance between the two contacting partners. The leakage inductance, which may also be represented as serial inductance in the equivalent circuit diagram, turns out to be annoying particularly in conventional circuit arrays for an inductive transmission, because their impedance limits the maximum current that can be transmitted. An array with low leakage inductance, however, requires a minimum width of the gap between the transmission elements. This signifies mostly a high mechanical complexity and a low flexibility in application.

BRIEF DESCRIPTIONS OF THE INVENTION

The invention is based on the problem of proposing an array for contact-less transmission, which can be realised at low costs specifically in a high number of transmission sites, with the simultaneous possibility to tolerate a wider gap between the transmission partners.

One inventive solution to this problem is defined in Patent claim 1. Improvements of the invention are the subject matters of the dependent claims.

In the present description; the terms "core", "ferrite core" or also "iron core" are used in an equivalent sense to denote the magnetic medium. In the most general case, this term means a magnetic medium with $\mu_r>1$. An explicit distinction is not made either between signal transmission and the transmission of energy because a signal cannot be transmitted without energy and as transmitted energy may also contain information.

This inventive array consists of several resonance transformers based on inductive coupling. To this end, the individual inductive are completed to form elements capable of resonating. This may be an isolated capacitor for all inductances or also an array in which a respective capacitor is associated with each separator inductor or a group of inductors. These elements are then preferably supplied by a common feeder device. This feeder device contains a device that controls the AC voltage or current source in such a way that that the latter operates on a resonant frequency of the transmission array.

Another expedient embodiment of the invention consists in the provision that the parasitic capacitances of the inductive coupling elements are so designed that they contribute a substantial share to the resonant frequency. In an extreme case, these parasitic capacitances are so high that resonance capacitors can be dispensed with entirely. To this end, the winding capacitance is present anyhow, can be utilised in an expedient manner.

In a further expedient embodiment of the invention, the inductive coupling elements are completed by appropriate capacitances to form series resonance circuits. This design of the series resonance circuits may optionally be made on the primary or secondary side or on both sides, respectively, of the inductive coupling elements. Apart from a series resonance of the circuit, mostly at least one further parallel resonance is achieved. What is essential in this array, however, is the fact that the feeder device is so designed that feeding takes place in the vicinity of the series resonant frequency.

Another embodiment of the invention consists in the aspect that the inductive transmission elements are completed by appropriate capacitances connected in series, to form parallel resonance circuits. This completion may be optionally on the primary side, the secondary side or even on both sides of the inductive coupling elements. In addition to a parallel resonance of the circuit, mostly at least one further series resonance is created. What is essential in this array is the aspect, however, that the feeder device is so designed that feeding takes place in the vicinity of the parallel resonant frequency.

In a further expedient embodiment of the invention, additional capacitive coupling elements are provided for the transmission of additional information.

According to another advantageous embodiment of the invention, a magnetic path of the inductive coupling element, which is not yet used for the transmission of energy, is utilised for the transmission of further information. This may be the exterior surface of the core, for example, with the magnetic flux then persisting via the environment of the core through the air. In the event of a multi-branch core, the magnetic flux may take place via the two outside branches or further branches.

In another embodiment of the invention, a modulator or demodulator unit is provided for transmitting additional information, in which the information is modulated or demodulated by means of a carrier frequency that is sufficiently far spaced from the frequencies of the feeder device. Such a transmission of additional information is easily possible here in a frequency band other than the frequency band used for the transmission of energy because the energy is transmitted by resonance circuits only within a narrow bandwidth. Hence, one and the same coupling element may serve to transmit information along the same magnetic path as that used for energy transmission. But even in the case of transmission by means of capacitive coupling surfaces and in the case of transmission along another magnetic path this array creates a widened signal-to-noise ratio.

Another embodiment of the invention consists in the aspect that these capacitive coupling elements are disposed in the immediate coupling range of the inductive coupling elements. With such an arrangement, a highly space-saving structure is possible because additional space is not required for the capacitive coupling means. Such an arrangement of the capacitive coupling elements in the magnetic field of the inductive transmission system permits an independent transmission of both signals. In the inventive arrangement, this is easily possible because electrical and magnetic fields do not take an influence on each other. When in another expedient embodiment of the invention, the capacitive coupling means is designed here as pc board it provides an additional mechanical protection of the inductive coupling means. In distinction from the array disclosed in the laid-open German Patent Application DE 41 25 145, the inventive array provides for a complete covering of the inductive coupling element.

In another expedient embodiment of the invention, the control element is so designed that, in cooperation with the AC voltage or current source and the resonance circuits, they furnish a self-oscillating power oscillator. The principle of such an arrangement is disclosed in the laid-open German Patent Application DE 197 01357.

In another embodiment, the control element defines a fixed frequency for the AC voltage or current source.

According to a further advantageous embodiment of the invention, a circuit consisting of a rectifier with a joining linear controller is provided on the receiver side in the case of at least one receiver. This provision may serve to reduce the ripple in the transmitted voltage and allows control to a constant value.

In another expedient embodiment of the invention, a synchronous detector is used that is controlled by an appropriate phase controller. Such synchronous detectors present the advantage that they achieve substantially lower losses with actively connected elements than this is possible with passive rectifiers.

With a further advantageous design of the invention, a synchronous detector is provided with a phase controller in the case of at least one receiver, which rectifier controls the power flow from the circuit on the secondary side by means of the phase controller.

In another expedient embodiment of the invention, with at least one receiver, a rectifier with a joining switching controller is provided for a particularly low-loss conversion of the output voltage into other values.

BRIEF DESCRIPTION OF THE DRAWING

The invention will be described in the following by exemplary embodiments, without any restriction of the general inventive idea, with reference to the drawing to which explicit reference is made, by the way, as far as the disclosure of all inventive details is concerned which are not explained more exhaustively in the text. In the drawing.

DESCRIPTION OF EMBODIMENTS

Figure 1:
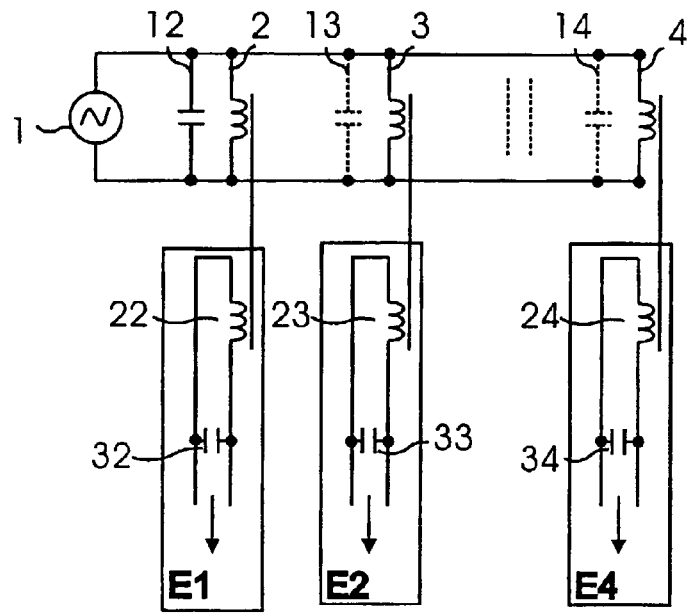
FIG. 1 illustrates an example of a circuit diagram of an inventive array including parallel resonance circuits.

FIG. 1 illustrates an exemplary inventive arrangement. In the transmitter, an AC voltage source with an integrated control element (1) supplies the inductive coupling elements consisting each of a primary winding (2, 3, 4) and a secondary winding (22, 23, 24). In that array several primary windings are coupled to one respective transmitter whilst the secondary windings are associated with independent receivers in loose mechanical contact with the transmitters. In order to achieve a circuit capable of resonating in parallel, the inductance is supplemented optionally on the primary winding and/or on the secondary winding to form a parallel resonance circuit with appropriate capacitances. The capacitance elements on the primary side (12, 13, 14) are associated with the transmitter whereas the secondary side capacitance elements (32, 33, 34) associated with a respective receiver.

Figure 2:
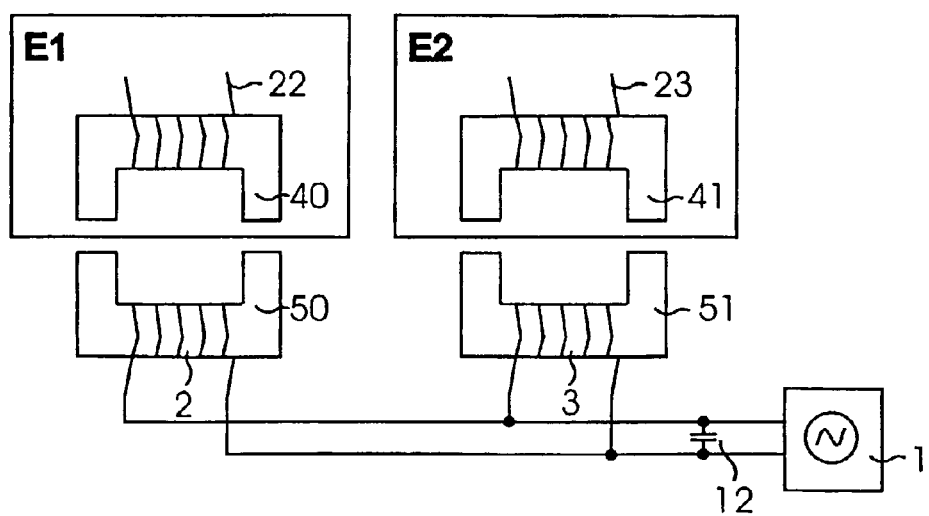
FIG. 2 is a schematic view of a mechanical structure of an inventive array.

FIG. 2 is a schematic view of an example of a mechanical structure of an inventive array. It is apparent there how the individual receivers are associated with the corresponding positions of the transmitter so that a magnetic coupling of the inductance elements on the primary side, which consist of a ferrite or iron core (50, 51), as well as the associated primary windings (2, 3) and the secondary inductance elements corresponding thereto, which consist of the ferrite or iron cores (40, 41), and the associated windings (22, 23) is achieved.

Figure 3:
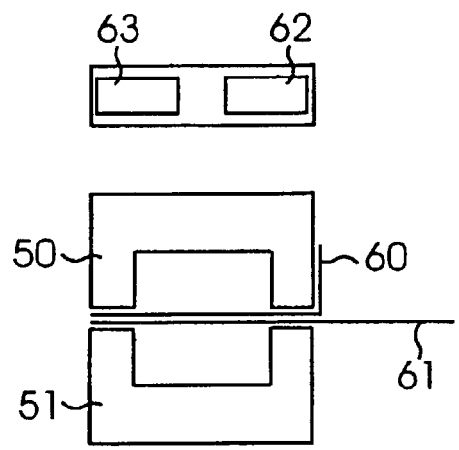
FIG. 3 illustrates the structure of a combined array with inductive and capacitive transmission.

FIG. 3 illustrates the structure of a combined array with inductive and capacitive transmission. Here, the ferrite core (51) on the primary side corresponds to the ferrite core (50) on the secondary side. A pc board containing conductor structures (60, 61) for capacitive signal transmission is disposed on each side between the two halves of the core. These pc boards are spaced from each other by a small distance so that electrical signals can be transmitted between the transmitter side and the receiver side due to the high capacitance so created. As an example, here an array is illustrated in a plan view, which consists of two conductor surfaces (61 62, 63).

Figure 4:
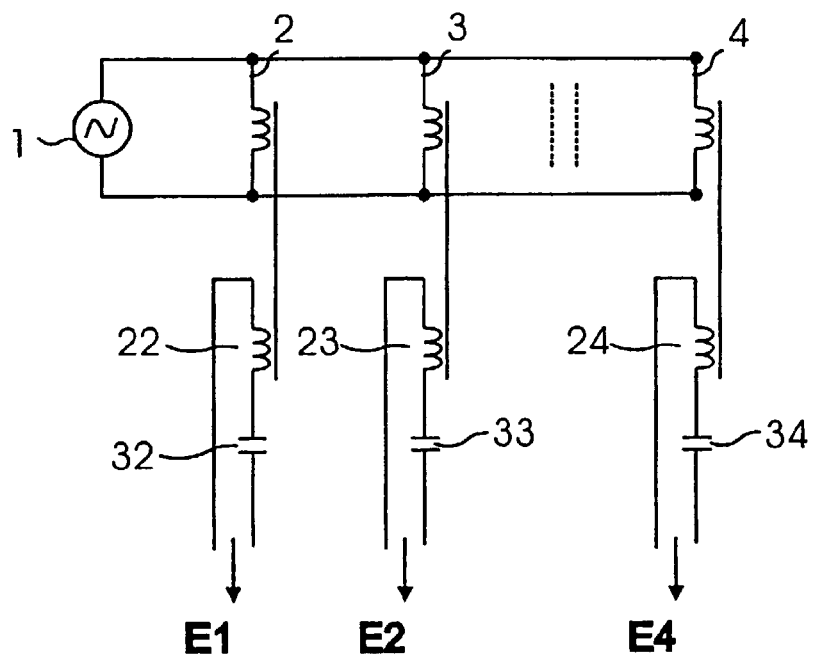
FIG. 4 shows an exemplary arrangement with series resonance circuits.

FIG. 4 shows an exemplary array with series resonance circuits. In the transmitter, an AC voltage source with an integrated control element (1) supplies the inductive coupling elements that consist each of a primary winding (2, 3, 4) and a secondary winding (22, 23, 24). Here, several primary windings are coupled to one respective transmitter whilst the secondary windings are associated with independent receivers in loose mechanical contact with the transmitters. In order to achieve a circuit capable of resonating in parallel, the inductance is supplemented optionally on the primary winding and/or on the secondary winding to form a parallel resonance circuit with appropriate capacitances. The capacitance elements on the primary side (12, 13, 14), shown in FIG. 1, are associated with the transmitter whilst the capacitance elements (32, 33, 34) on the secondary side are associated each with a receiver.

Figure 5:
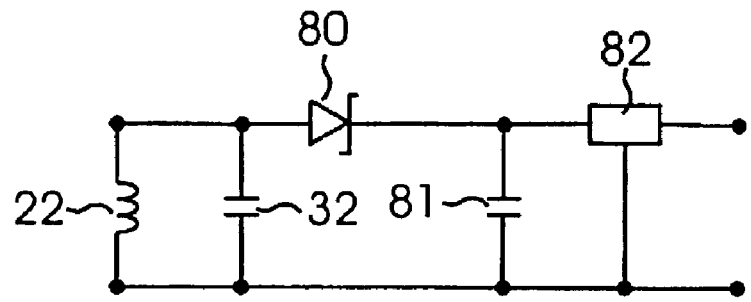
FIG. 5 shows an exemplary arrangement including a rectifier and a joining linear controller.

FIG. 5 illustrates a typical array of a circuitry on the secondary side in correspondence with the present invention. Here, the secondary winding (22) serves to couple out the electrical signals. The corresponding parallel resonance capacitance—which is illustrated here for the case of parallel resonance as an example—is realised with the capacitor (32). The signal applied to the parallel resonance circuit is rectified by means of a diode (80) and screened in the capacitor (81). A joining linear controller (82) is provided for controlling the output voltage.

Figure 6:
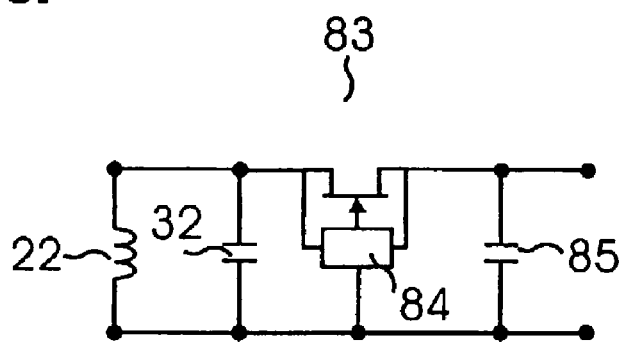
FIG. 6 is a view of an example of an array including a synchronous detector.

FIG. 6 is an exemplary illustration of an appropriate circuit of a secondary side in the case of parallel resonance with a synchronous detector. The signal is coupled out via the inductance element (22) on the secondary side. The latter cooperates with the parallel capacitor (32) so as to establish a parallel resonance circuit. In this case, for example, the synchronous detector consists of a controlled MOS-FET element (83) that is controlled via a controller unit (84). The output signal is smoothed via a capacitor (85).

Figure 7:
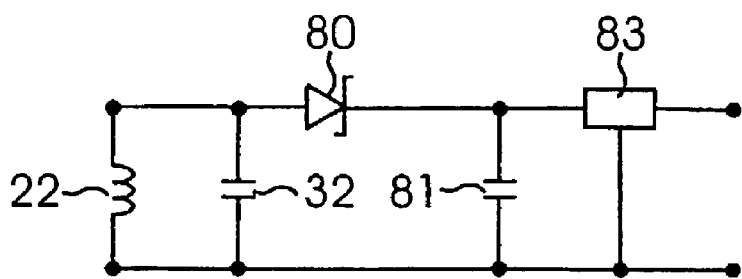
FIG. 7 shows an exemplary arrangement of a rectifier with a joining switching controller.

FIG. 7 is an exemplary view of another inventive array including a switching controller on the output of the circuitry on the secondary side. Here, the signal is coupled out again by means of a secondary inductor element (22) that is supplemented via the capacitor (32) connected in parallel therewith so as to form a parallel resonance circuit. The signal at the parallel resonance circuit is rectified by means of a Schottky diode (80) and filtered through a first filtering capacitor (81). The subsequent control and transformation into other voltages are realised by means of a fixed-cycle switching controller (83).

Figure 8:
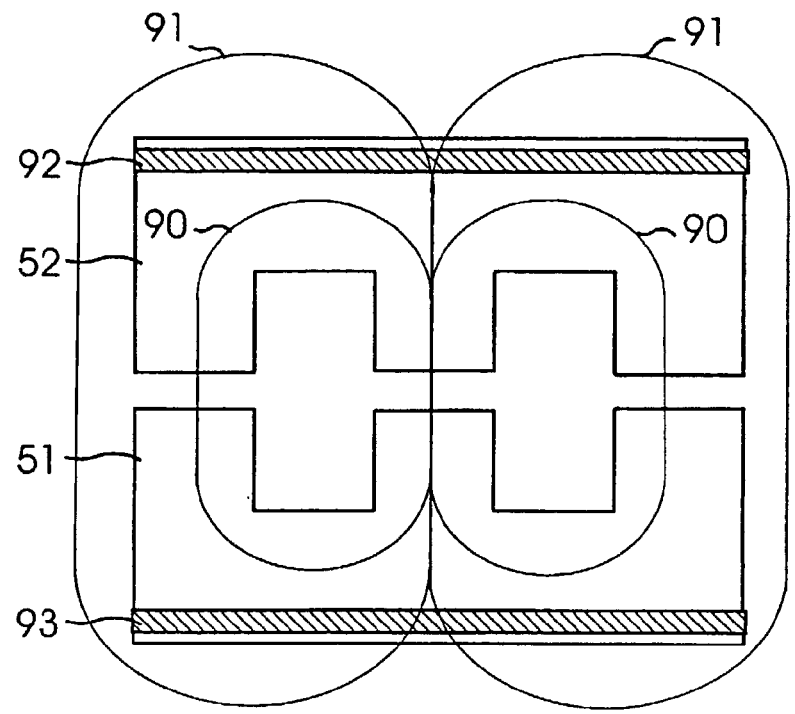
FIG. 8 is a view of an exemplary arrangement with additional signal transmission in the case of a closed iron or ferrite core.

FIG. 8 is an exemplary illustration of an array with additional signal transmission in the case of a closed iron or ferrite core, respectively. Here, the magnetic core on the primary side (51) is coupled to the core of the secondary side (52). The magnetic flux for the transmission of energy as claimed is indicated by the lines (90). The lines (91) represent the magnetic flux for the transmission of additional signals. Here, the magnetic field partly passes through the core. As a rule, the flux leakage field is negligible because the magnetic field intensities for the transmission of additional information is substantially smaller than the field strength for the transmission of energy. The windings (92) and (93) are provided for coupling in and out for the transmission of additional information.

Figure 9:
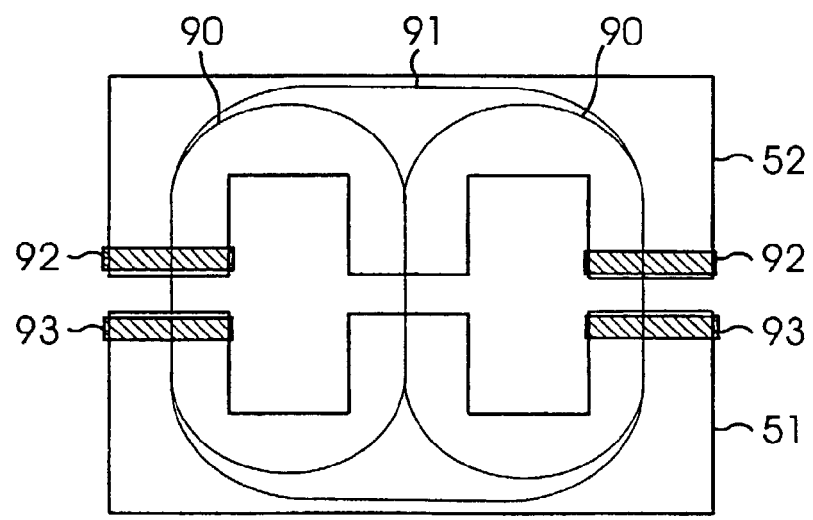
FIG. 9 shows an exemplary array with additional signal transmission in the case of a multi-branch iron or ferrite core.

FIG. 9 shows an example of an array with additional signal transmission in the case of a multi-branch iron or ferrite core. Here, the magnetic core on the primary side (51) is coupled to the core of the secondary side (52). The magnetic flux for the transmission of energy according to claim 1 is represented by the lines (90). The lines (91) indicate the magnetic flux for the transmission of additional signals. The windings (91) and (93) serve for coupling in and out for the transmission of additional information. In this example, these windings are designed as differential windings so that the voltages created by the magnetic flux for energy transmission (90) compensate each other.

The invention claimed is:

1. Array for the contact-less transmission of electrical signals or energy, respectively, from at least one transmitter to several receivers, characterized in that each transmitter comprises an AC voltage or current source, respectively, as well as a plurality of inductive coupling elements supplied in parallel or in series from said source, which said plurality of inductive coupling elements are supplemented by at least one capacitor to form resonance circuits whose outputs are sent to respective said receivers that equal in number to said plurality of inductive coupling elements, and that furthermore one control element controls said AC voltage or current source, respectively, in such a way that the latter operates on a resonant frequency of said plurality of inductive coupling elements configured for resonating, and wherein additional capacitive elements are provided for the transmission of additional signals, and said additional signals are transmitted via a magnetic path associated with a magnetic outside surface of the transmitter or further branches in the case of multi-branch cores, which said magnetic path is not used for the transmission of energy.

2. Array according to claim 1, characterized in that said inductive coupling elements are so designed that their parasitic capacitance contributes at least a substantial fraction to the resonance capacity.

3. Array according to claim 1 characterized in that said inductive coupling elements are supplemented to form series resonance circuits, and that said control element is so designed that said AC voltage or current source, respectively, is operated at a parallel resonance frequency.

4. Array according to claim 1, characterized in that said inductive coupling elements are supplemented to form parallel resonance circuits, and that said control element is so designed that said AC voltage or current source, respectively, is operated at a series resonance frequency.

5. Array according to claim 1, characterized in that at least one additional modulator unit or demodulator unit is provided for the transmission of additional signals within a frequency band different from the resonant frequency.

6. Array according to claim 5, characterized in that said additional capacitive elements are provided for the transmission of additional signals in the range of the magnetic field of said inductive coupling element.

7. Array according to claim 6, characterized in that said additional capacitive coupling elements are integrated into a pc board that constitutes, at the same time, a mechanical cover for said inductive coupling elements.

8. Array according to claim 7, characterized in that said control element is so designed that it cooperates with said AC voltage or current source, respectively, and said resonance circuits to form a self-oscillating power oscillator.

9. Array according to claim 8, characterized in that said control element defines an invariable frequency for said AC voltage or current source, respectively.

10. Array according to claim 9, characterized in that a rectifier circuit with a joining linear controller is associated with at least one receiver.

11. Array according to claim 10, characterized in that a synchronous detector is connected downstream of at least one receiver.

12. Array according to claim 11, characterized in that a synchronous detector is associated with at least one receiver, which controls the power flow by controlling the phase.

13. Array according to claim 12, characterized in that a switching controller with a series rectifier is associated with at least one receiver.

* * * * *